(12) United States Patent
Tsutsumi

(10) Patent No.: US 6,311,914 B1
(45) Date of Patent: Nov. 6, 2001

(54) AUXILIARY FRAME OF SPOOL OF SPINNING REEL FOR FISHING

(75) Inventor: Wataru Tsutsumi, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/302,326

(22) Filed: Apr. 30, 1999

(30) Foreign Application Priority Data

Apr. 30, 1998 (JP) .................................................. 10-120549

(51) Int. Cl.⁷ .................................................. A01K 89/00
(52) U.S. Cl. .................................................. 242/322; 242/323
(58) Field of Search .................................. 242/224, 311, 242/312, 313, 322, 323, 613.1, 609, 609.2, 609.4

(56) References Cited

U.S. PATENT DOCUMENTS

| | | | |
|---|---|---|---|
| 1,167,723 | * | 1/1916 | Scott .................................. 242/613.1 |
| 1,265,110 | * | 5/1918 | Prentiss .......................... 242/613.1 X |
| 1,408,463 | * | 3/1922 | Miles .............................. 242/613.1 X |
| 2,932,465 | * | 4/1960 | Johnson . |
| 3,870,245 | * | 3/1975 | Witteborg, Jr. ................... 242/322 X |
| 3,940,085 | * | 2/1976 | Campbell ........................... 242/609.2 |

FOREIGN PATENT DOCUMENTS

| | | | |
|---|---|---|---|
| 1219868 | * | 5/1960 | (FR) .................................. 242/613.1 |
| 61152269 | | 9/1986 | (JP) . |
| 6338769 | | 3/1988 | (JP) . |

* cited by examiner

Primary Examiner—Emmanuel M. Marcelo
(74) Attorney, Agent, or Firm—Liniak, Berenato, Longacre & White

(57) ABSTRACT

An auxiliary frame is attached to a spool of a spinning reel for fishing. The frame has a tapered fishing line winding face, the diameter of which is gradually reduced toward the rear in the axial direction of a spool shaft.

10 Claims, 8 Drawing Sheets

AUXILIARY FRAME OF SPOOL OF SPINNING REEL FOR FISHING

BACKGROUND OF THE INVENTION

The present invention relates to an auxiliary frame attached to a spool of a spinning reel for fishing.

As conventionally known, a spinning reel for fishing is constructed as follows. A semi-annular bail is attached via bail support members to the ends of a pair of support arms arranged on a rotor. The semi-annular bail can be freely inverted between a fishing line winding position and a fishing line releasing position.

When the bail is tilted to the fishing line releasing position and a tackle is cast, the fishing line wound around a spool is spirally released. When the bail is inverted to the fishing line winding position and the rotor is rotated by a handle in the fishing line winding direction, the fishing line is wound around the spool which is reciprocated in the longitudinal direction in linked with the rotation of the rotor.

In this connection, as disclosed in Japanese Unexamined Utility Model Publication Nos. 61-152269 and 63-38769 and also as shown in FIG. 8, a conventional spool 1 attached to the spinning reel includes a fishing line winding barrel 3 around which a fishing line is wound, a front side flange 5 arranged in the front of the fishing line winding barrel 3, and a rear side flange 7 arranged at the rear of the fishing line winding barrel 3.

In general, a fishing line winding face 3a of the fishing line winding barrel 3 is formed into a tapered shape (a positive taper), the diameter of which is gradually reduced toward the front in the axial direction of a spool shaft. The fishing line is wound around the fishing line winding face 3a thus tapered positively.

However, in the above conventional shape of the spool, the following problems may be encountered. When an angler strongly swings a fishing rod to cast a tackle far away off, the fishing line wound around the fishing line winding face 3a in the proximity of the rear side flange 7 can be smoothly released. However, the fishing line wound around the fishing line winding face 3a in the proximity of the front side flange 5 is collapsed toward the front by the energy given to the fishing line when it is cast and also by the resistance of the fishing line caused between the adjacent parts of the wound fishing line.

The collapse of the fishing line hinders the smoothly release of the fishing line and reduces the casting distance of the fishing line.

Recently, in order to solve the above problems, Japanese Utility Model Registration Publication No. 3007531 discloses a spool 11, which is shown in FIG. 9. As illustrated, the fishing line winding face 9a of the fishing line winding barrel 9 is formed into such an inversely tapered shape (a negative-tapered shape) that is opposite from the above fishing line winding face 3a.

According to the above spool 11, since the fishing line winding face 9a is formed into the inversely tapered shaped, the wound fishing line 13 is not affected by the releasing energy given to the fishing line and the resistance caused between adjacent parts of the fishing line. Therefore, it is possible to prevent the wound fishing line 13 from collapsing.

However, the following problems can not be solved by the spool 11 shown in FIG. 9. Since a taper angle and fishing line winding capacity of the fishing line winding face 9a of the fishing line winding barrel 9 are kept constant at all times, it is impossible for the spool 11 to cope with various conditions and uses, which are estimated in the case of actual fishing, such as a type of fishing line to be used, a quantity of fishing line to be wound around the fishing line winding barrel, a method of fishing and a degree of skill of an angler.

SUMMARY OF THE INVENTION

The present invention has been achieved in view of the above circumstances. It is an object of the present invention to provide an auxiliary frame of a spool of a spinning reel for fishing, with which an angler can appropriately change a state of winding a fishing line in an actual case of fishing according to the circumstances.

In order to accomplish the above object, the invention provides an auxiliary frame of a spool of a spinning reel for fishing detachably attached to a fishing line winding barrel of a spool, including a tapered fishing line winding face, the diameter of which is gradually reduced toward the rear in the axial direction of a spool shaft.

According to the invention, unless the auxiliary frame is not attached to the spool, the fishing line is wound around the fishing line winding face of the fishing line winding barrel of the spool in association with the winding operation by the handle. When the tackle is cast, the fishing line wound around the spool is spirally released.

In the case where the auxiliary frame of the spool is attached to the fishing line winding face of the spool, the fishing line is wound around the inversely tapered fishing line winding face of the auxiliary frame of the spool in association with the winding operation by the handle. When the tackle is cast, the fishing line wound around the auxiliary frame of the spool can be released without being given the releasing energy and without being affected by the resistance of the fishing line.

DETAILED DESCRIPTION OF THE PREFERRED EMBODIMENT

Referring to the accompanying drawings, an embodiment of the present invention will be explained below.

Figure 1:
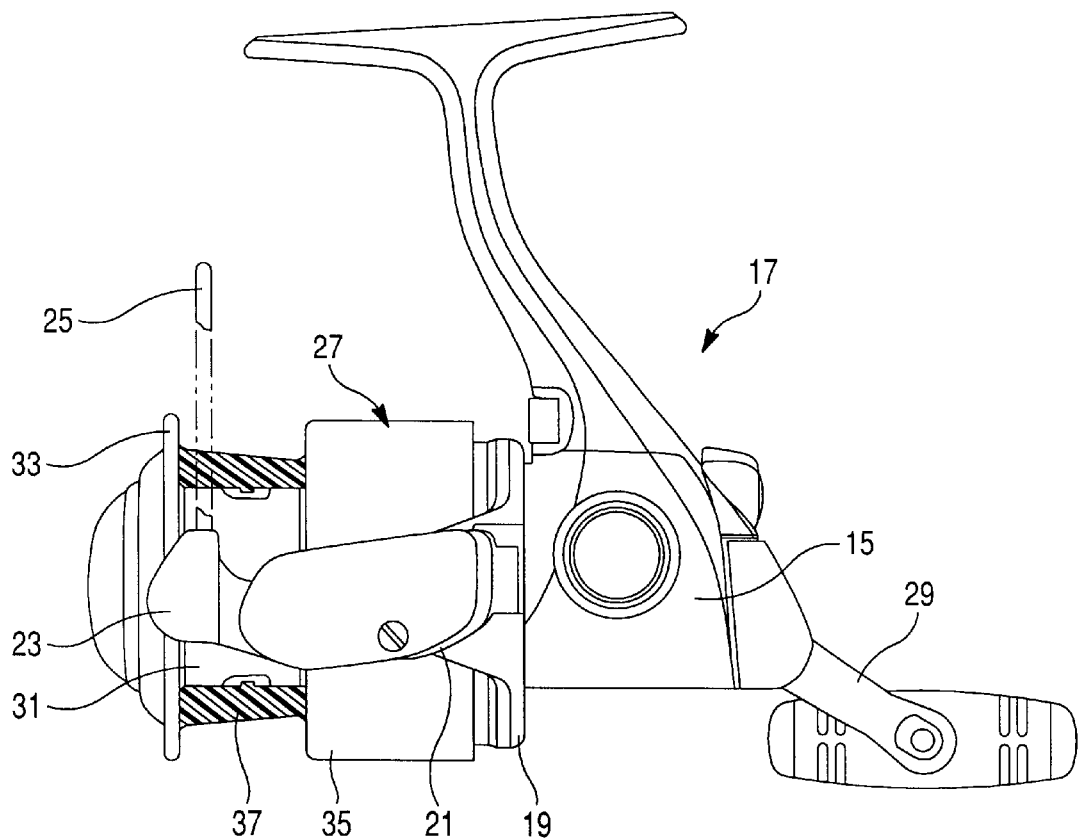
FIG. 1 is a front view of a spinning reel to which an auxiliary frame of a spool according to the first embodiment is attached, wherein a primary portion of the spinning reel is cut out in the view.

FIG. 1 is a front view of a spinning reel for fishing to which an auxiliary frame of a spool of the first embodiment of the present invention is attached. In the drawing, reference numeral 15 is a reel body of a spinning reel 17. A rotor 19 is pivotally attached to the front end of the reel body 15. A pair of support arms 21 are integrally attached to a rotor 19 to extend in the longitudinal direction of the reel body 15.

At an end of one support arm not shown in the drawing, a bail arm for supporting a line roller is attached in such a manner that the bail arm can be freely inverted between a fishing line winding position side and a fishing line releasing position side. At an end of the other support arm 21, a bail holder 23 is attached in such a manner that the bail holder 23 can be freely inverted between the fishing line winding position side and the fishing line releasing position side in the same manner as described above. A semi-annular bail 25 is attached between the bail holder 23 and the line slider.

Figure 2:
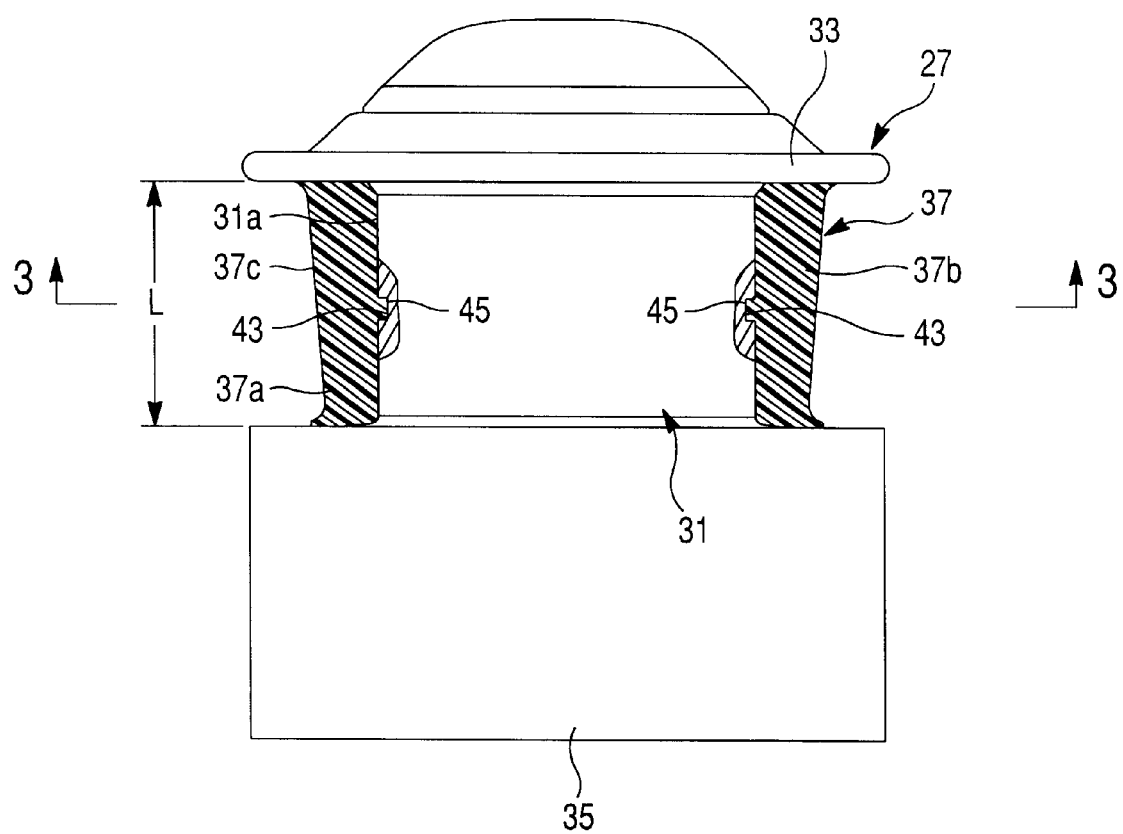
FIG. 2 is a longitudinally cross-sectional view of the auxiliary frame attached to the spool according to the first embodiment.
Figure 3:
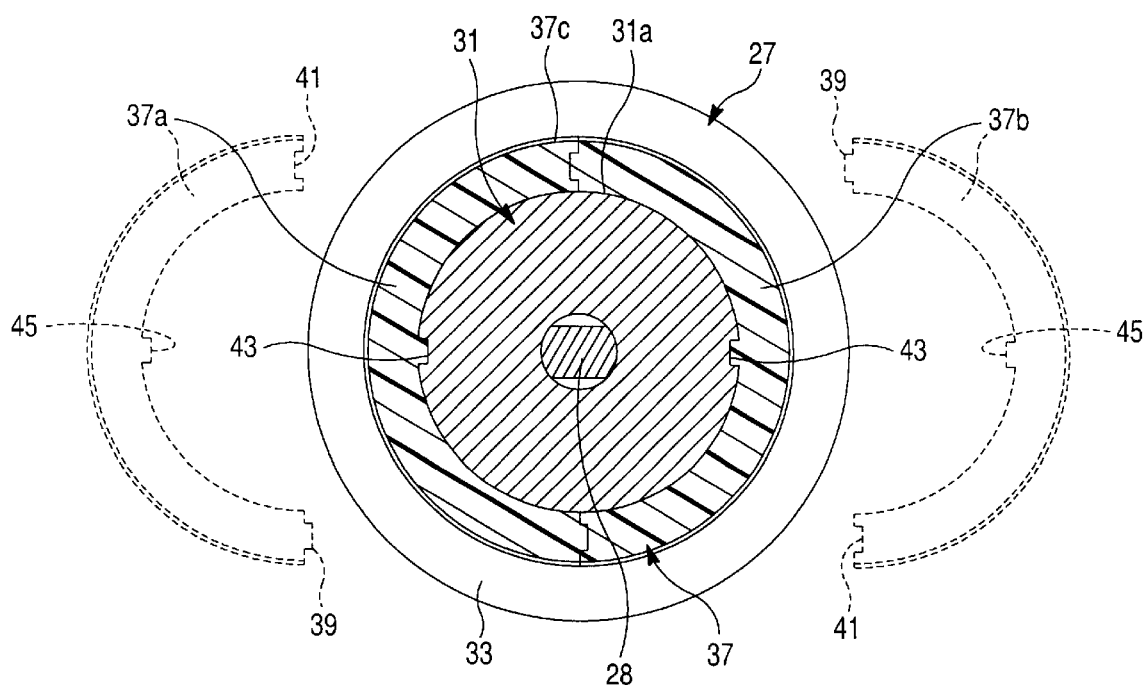
FIG. 3 is a cross-sectional view taken on line III—III in FIG. 2.

In FIGS. 1 to 3, reference numeral 27 is a spool arranged coaxially with respect to the rotor 19. The spool 27 is screwed to an end of a spool shaft 28 with an attaching nut. The spool shaft 28 is supported by the reel body 15 so as to make a traverse motion.

In the same manner as that of the conventional spinning reel, when the bail 25 is tilted to the fishing line releasing position and the tackle is cast, the fishing line wound around the spool 27 is spirally released. When the bail 25 is inverted to the fishing line winding position and the rotor 19 is rotated by a handle 29 in the fishing line winding direction, the fishing line is wound around the spool 27 which is traversed in the longitudinal direction of the reel body 15 being linked with the rotation of the rotor 19.

As shown in FIG. 2, the spool 27 includes: a fishing line winding barrel 31 on which a fishing line winding face 31a is formed straight in the axial direction of the spool shaft 28; a front side flange 33 arranged in the front of the fishing line winding barrel 31; and a rear side flange 35 arranged at the rear of the fishing line winding barrel 31. An auxiliary frame (spool spacer) 37 of the spool of this embodiment is detachably attached onto the fishing line winding face 31a of the fishing line winding barrel 31.

As shown in FIGS. 2 and 3, the auxiliary frame 37 of the spool is composed of a pair of split frames 37a, 37b made of light resin, the transverse cross-section of which is a semicircular and the size of which is the same as the size L of the fishing line winding barrel 31. Inner circumferences of the split frames 37a and 37b are the same as the circumference of the fishing line winding face 31a.

When an engaging piece 39 and engaging hole 41, which are provided on the contact end surfaces of both split frames 37a and 37b, are engaged with each other, the auxiliary frame 37 of the spool can be coupled together. Outer shapes of both split frames 37a and 37b are so designed that an outer circumference of the auxiliary frame 37 of the spool defines an inversely tapered fishing line winding face 37c, the diameter of which is gradually reduced toward the rear in the axial direction of the spool.

In this connection, the maximum diameter of the auxiliary frame 37 of the spool is set to be smaller than the diameter of the front side flange 33, and the fishing line is wound around the fishing line winding face 37c of the auxiliary frame 37 of the spool between the front side flange 33 and the rear side flange 35.

The winding barrel face 37c of the auxiliary frame 37 defines a frusto-conical sleeve terminating a opposite terminal edges defining opposite openings in the auxiliary frame 37. The opposite edges are separated by a distance no greater than a length of the fishline winding barrel 31 in the axial direction.

As shown in FIG. 3, there are formed two circular engaging holes 43, which are opposed to each other diametrically with respect to the spool shaft 28 at the angular interval of 180°, and located in the middle portion of the fishing line winding face 31a of the fishing line winding barrel 31 in the longitudinal direction. On the inner circumferences of both split frames 37a and 37b, there are provided column-shaped engaging pieces 45 corresponding to the engaging holes 43. The engaging pieces 45 can be attached to and detached from the engaging holes 43. When the split frames 37a and 37b are attached onto the fishing line winding faces 31a, the auxiliary frame 37 of the spool can not be rotated with respect to the spool 27 by the engagement of the engaging pieces 45 with the engaging holes 43.

When both split frames 37a and 37b are attached onto the fishing line winding face 31a while the engaging pieces 39 are respectively engaged with the engaging holes 41 and also the engaging pieces 45 are respectively engaged with the engaging holes 43 as described above, the auxiliary frame 37 of the spool, the shape of which is inversely tapered, can be attached to the spool 27 as shown in FIG. 2. However, when both split frames 37a and 37b are inverted in the longitudinal direction and attached onto the fishing line winding face 31a, the fishing line winding face 37c of the auxiliary frame 37 of the spool can be formed into a normal taper as shown in FIG. 4.

Since this embodiment is constructed as described above, unless the auxiliary frame 37 of the spool is attached to the spool 27, the fishing line is wound around the fishing line winding face 31a of the straight fishing line winding barrel 31 of the spool 27 according to the fishing line winding operation of the handle 29. When the tackle is cast by an angler while the bail 25 is being tilted to the fishing line releasing position side, the fishing line wound around the spool 27 is spirally released.

When the engaging pieces 45 are engaged with the engaging holes 43 while the engaging pieces 39 are being engaged with the engaging holes 41 as shown in FIGS. 1 to 3, both split frames 37a and 37b are attached onto the fishing line winding face 31a of the spool 27. Due to the foregoing, the auxiliary frame 37 of the spool, the shape of which is inversely tapered, can be attached to the spool 27. Therefore, according to the fishing line winding operation conducted by the handle 29, the fishing line 37c is wound around the fishing line winding face 37c of the auxiliary frame 37 of the spool, the shape of which is inversely tapered. When the tackle is cast by an angler while the bail 25 is being tilted to the fishing line releasing position side, the fishing line wound around the fishing line winding face 37c of the auxiliary frame 37 of the spool is spirally released.

Figure 4:
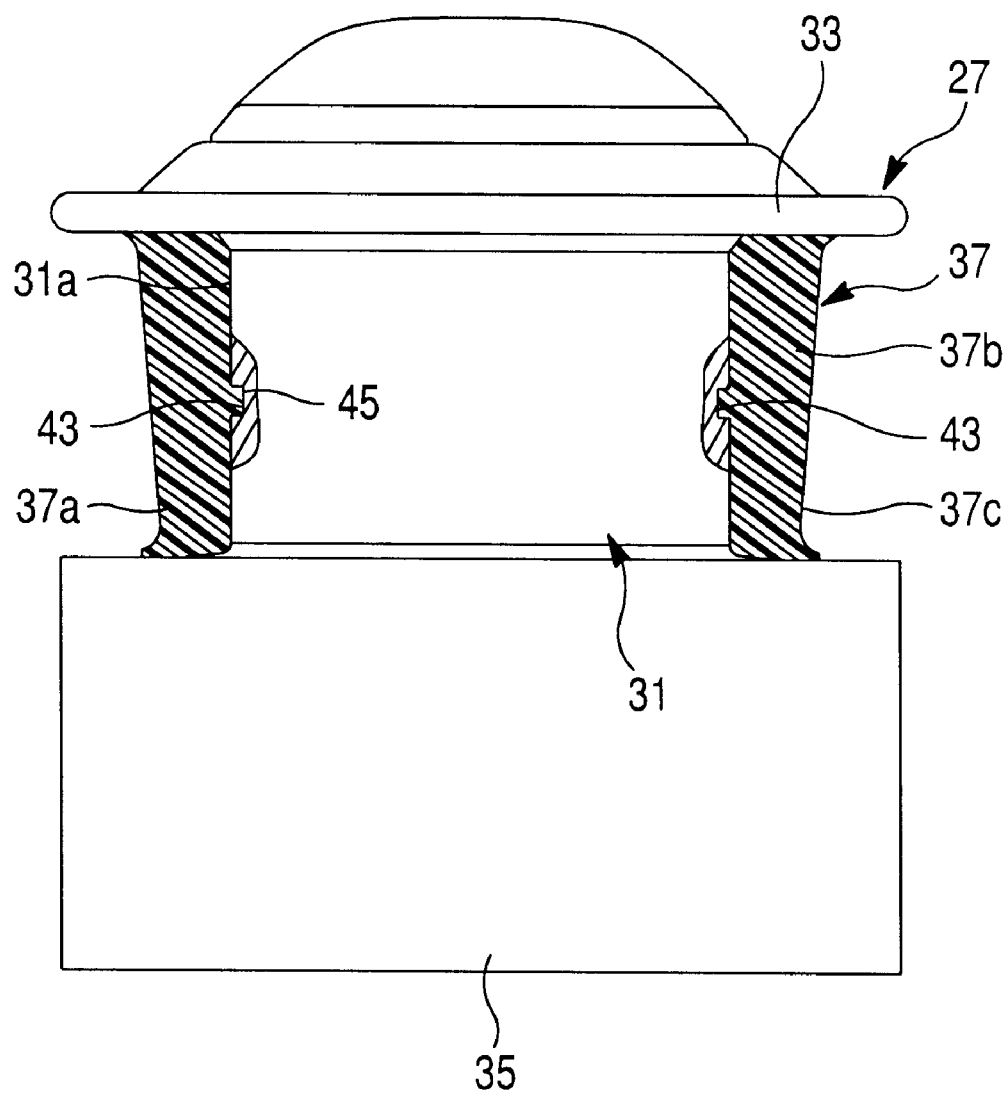
FIG. 4 is a longitudinally cross-sectional view of the auxiliary frame of the spool, which is reversely attached to the spool with respect to the longitudinal direction, according to the first embodiment.

When the auxiliary frame 37 of the spool is attached onto the fishing line winding face 31a of the spool 27 in such a manner that the fishing line winding face 31a is formed into a positively tapered shape as shown in FIG. 4, the fishing line is wound around the fishing line winding face 37c, the shape of which is normally tapered, of the auxiliary frame 37 of the spool according to the fishing line winding operation conducted by the handle 29. When the tackle is cast by an angler while the bail 25 is being tilted to the fishing line releasing position side, the fishing line wound around the fishing line winding face 37c is spirally released.

As described above, according to this embodiment, when the auxiliary frame 37 of the spool is attached to and detached from the fishing line winding face 31a of the fishing line winding barrel 31 of the spool 27, it is possible to appropriately change a fishing line winding form corresponding to various conditions and uses, which are estimated in the case of actual fishing, such as a type of fishing line to be used, a quantity of fishing line to be wound around the fishing line winding barrel, a method of fishing and a degree of skill of an angler. Therefore, it is possible to take an appropriate countermeasure in accordance with the condition of actual fishing.

Figure 9:
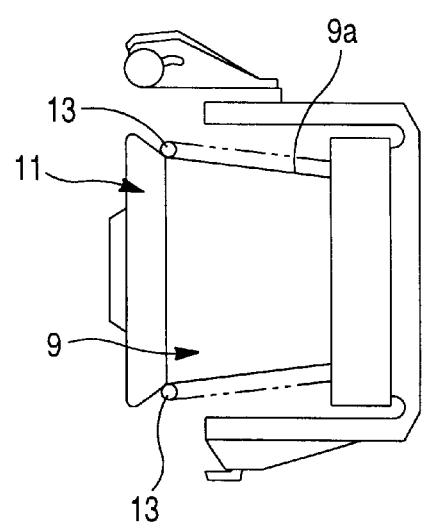
FIG. 9 is a front view of a conventional spool, the fishing line winding barrel of which is formed into an inversely tapered shape.

Further, when the auxiliary frame 37 of the spool is formed into an inversely tapered shape as shown in FIG. 2, it is possible to avoid an influence of energy in the case of releasing the fishing line and also it is possible to avoid an influence of resistance of the fishing line in the same manner as that of the spool 11 shown in FIG. 9. Therefore, it becomes possible to prevent the fishing line from collapsing.

Figure 5:
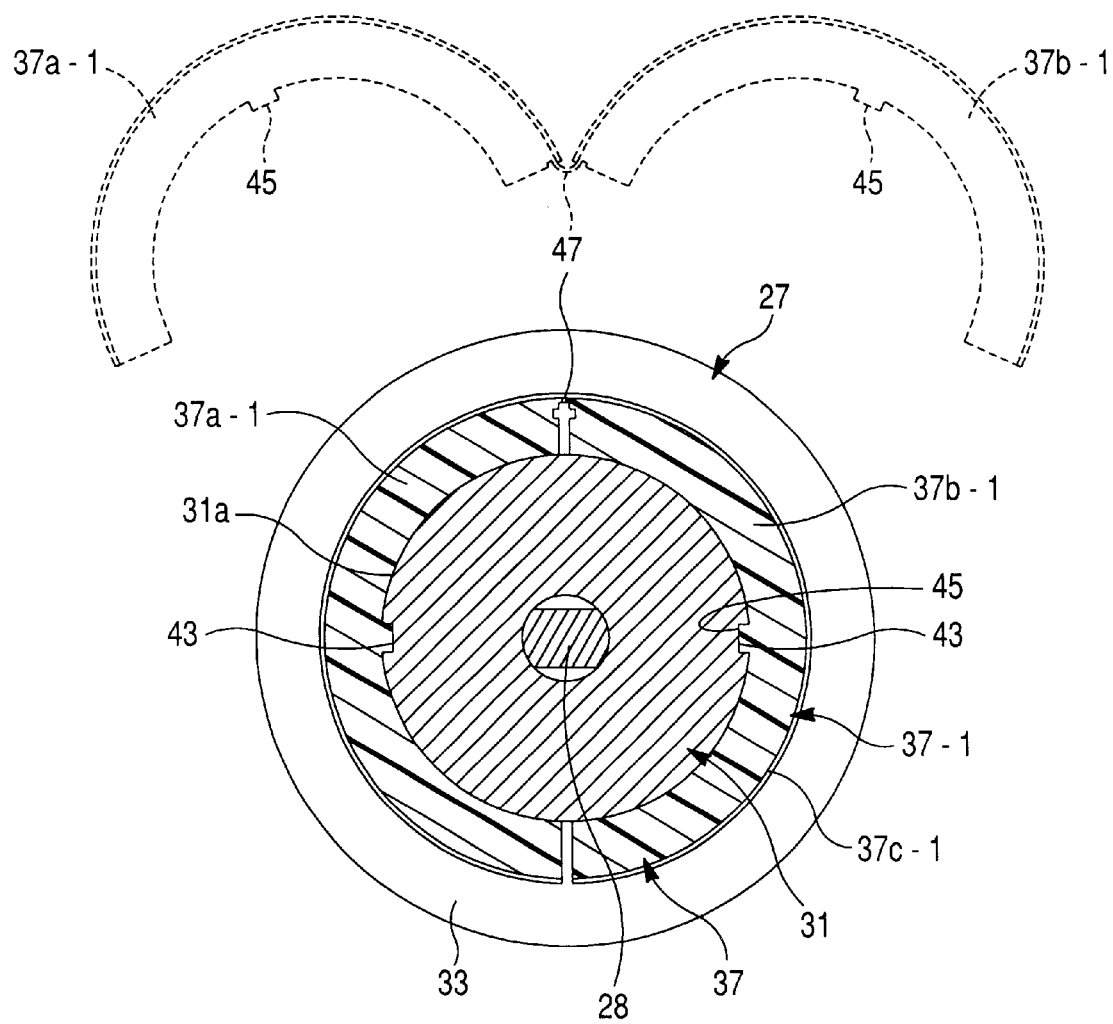
FIG. 5 is a transversely cross-sectional view of an auxiliary frame, which is attached to a spool, and a spool according to the second embodiment.

FIG. 5 is a view showing a second embodiment of the auxiliary frame of the spool according to the present invention. In the first embodiment described before, the auxiliary frame 37 of the spool is composed of a pair of split frames 37a and 37b which are separate from each other. However, in this embodiment, shapes of a pair of split frames 37a-1 and 37b-1 composing the auxiliary frame 37-1 of the spool are formed into the substantially same shapes as those of the split frames 37a and 37b, and both split frames 37a-1 and 37b-1 are integrally connected with each other by a thin flexible connecting piece 47. When the auxiliary frame 37-1 of the spool is attached to the spool 27, the connecting piece 47 forms a portion of the fishing line winding face 37c-1, that is, the connecting piece 47 does not protrude outside.

In this embodiment, the engaging pieces 39 and the engaging holes 41, which are provided in the first embodiment, are omitted, and the auxiliary frame 37-1 is closely integrated with the fishing line winding face 31a of the fishing line winding barrel 31 principally by a winding force of the fishing line which is wound around the fishing line winding face 37c-1 of the auxiliary frame 37-1 of the spool.

According to this embodiment, when the auxiliary frame 37-1 of the spool is attached to and detached from the fishing line winding face 31a of the spool 27, it is possible to appropriately change a fishing line winding form corresponding to various conditions and uses, which are estimated in the case of actual fishing, such as a type of fishing line to be used, a quantity of fishing line to be wound around the fishing line winding barrel, a method of fishing and a degree of skill of an angler. As a result, it is possible to take an appropriate countermeasure in accordance with the condition of actual fishing. Further, when the auxiliary frame 37-1 of the spool is formed into an inversely tapered shape, it is possible to avoid an influence of energy in the case of releasing the fishing line and also it is possible to avoid an influence of resistance of the fishing line. Therefore, it becomes possible to prevent the fishing line from collapsing.

Figure 6:
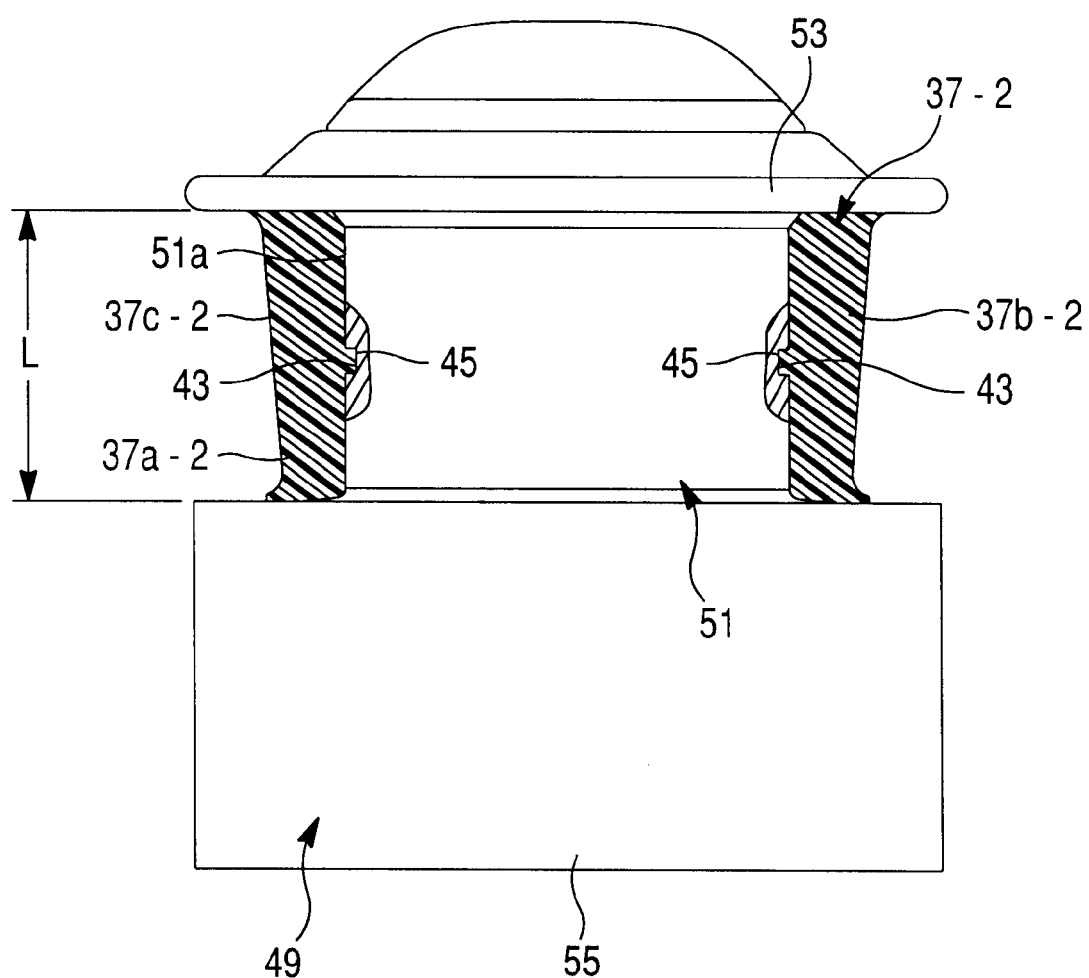
FIG. 6 is a longitudinally cross-sectional view of an auxiliary frame, which is attached to a spool, and a spool according to the third embodiment.

FIG. 6 is a view showing a spool to which an auxiliary frame of a spool of the third embodiment according to is attached. The spool 49 of this embodiment includes a-fishing line winding barrel 51 having a normally tapered fishing line winding face 51a, a front side flange 53 arranged in the front of the fishing line winding barrel 51, and a rear side flange 55 arranged at the rear of the fishing line winding barrel 51. The auxiliary frame 37-2 of the spool of this embodiment is detachably attached to the fishing line winding face 51a.

In the same manner as that of the first embodiment, the auxiliary frame 37-2 of the spool is composed of a pair of split frames 37a-2, 37b-2 made of light resin, the transverse cross-section of which is a semicircular and the size of which is the same as the size L of the fishing line winding barrel 51. Inner circumferences of the split frames 37a-2, 37b-2 are the same as the circumference of the fishing line winding face 51a.

Although not shown in the drawing, the same engaging pieces and engaging holes as those of the first embodiment are formed on the contact faces of both split frames 37a-2, 37b-2. Further, the same engaging pieces 45 and engaging holes 43 as those of the first embodiment are formed on the inner circumference and the fishing line winding face 51a of both split frames 37a-2, 37b-2. When both split frames 37a-2, 37b-2 are attached onto the fishing line winding face 51a by engaging the engaging pieces with the engaging holes, it is possible to form an auxiliary frame 37-2 of the spool having the fishing line winding face 37c-2, the shape of which is-inversely tapered in such a manner that the diameter is gradually reduced toward the rear in the axial direction of the spool shaft as shown in FIG. 5.

In this embodiment, the maximum diameter of the auxiliary frame 37-2 of the spool is set to be smaller than the diameter of the front side flange 53, and the fishing line is wound around the fishing line winding face 37c-2 of the auxiliary frame 37-2 of the spool between the front side flange 53 and the rear side flange 55.

Other points of structure of this embodiment are the same as those of the first embodiment described before. Therefore, like reference characters are used to indicate like parts in the first embodiment and this third embodiment, and explanations are omitted here.

Since this embodiment is composed as described above, unless the auxiliary frame 37-2 of the spool is attached to the spool 49, the fishing line is wound around the fishing line winding face 51a of the spool 49, the shape of which is normally tapered, by the fishing line winding operation of the handle 29. When the tackle is cast by an angler while the bail 25 is being tilted to the fishing line releasing position side, the fishing line wound around the spool 49 is spirally released.

When the auxiliary frame 37-2 of the spool, the shape of which is inversely tapered; which is composed of both split frames 37a-2, 37b-2, is attached onto the fishing line winding face 51a of the spool 49 as shown in FIG. 6, the fishing line is wound around the fishing line winding face 37c-2 of the auxiliary frame 37-2 of the spool, the shape of which is inversely tapered by the fishing line winding operation conducted by the handle 29. When the tackle is cast by an angler while the bail 25 is being tilted to the fishing line releasing position side, the fishing line wound around the fishing line winding face 37-2 is spirally released.

As described above, according to this embodiment, when the auxiliary frame 37-2 of the spool is attached to and detached from the fishing line winding face 51a of the spool 49, it is possible to appropriately change the fishing line winding form between a normal taper and an inverse taper. Therefore, corresponding to various conditions and uses, which are estimated in the case of actual fishing, such as a type of fishing line to be used, a quantity of fishing line to be wound around the fishing line winding face, a method of fishing and a degree of skill of an angler, it is possible to take an appropriate countermeasure in accordance with the condition of actual fishing.

Further, when the auxiliary frame 37-2 of the spool is used so that a winding form of the fishing line is made into an inversely tapered shape as shown in FIG. 6, it is possible to avoid an influence of energy in the case of releasing the fishing line and also it is possible to avoid an influence of resistance of the fishing line in the same manner as that of the spool 11 shown in FIG. 9. Therefore, it becomes possible to prevent the fishing line from collapsing.

Figure 7:
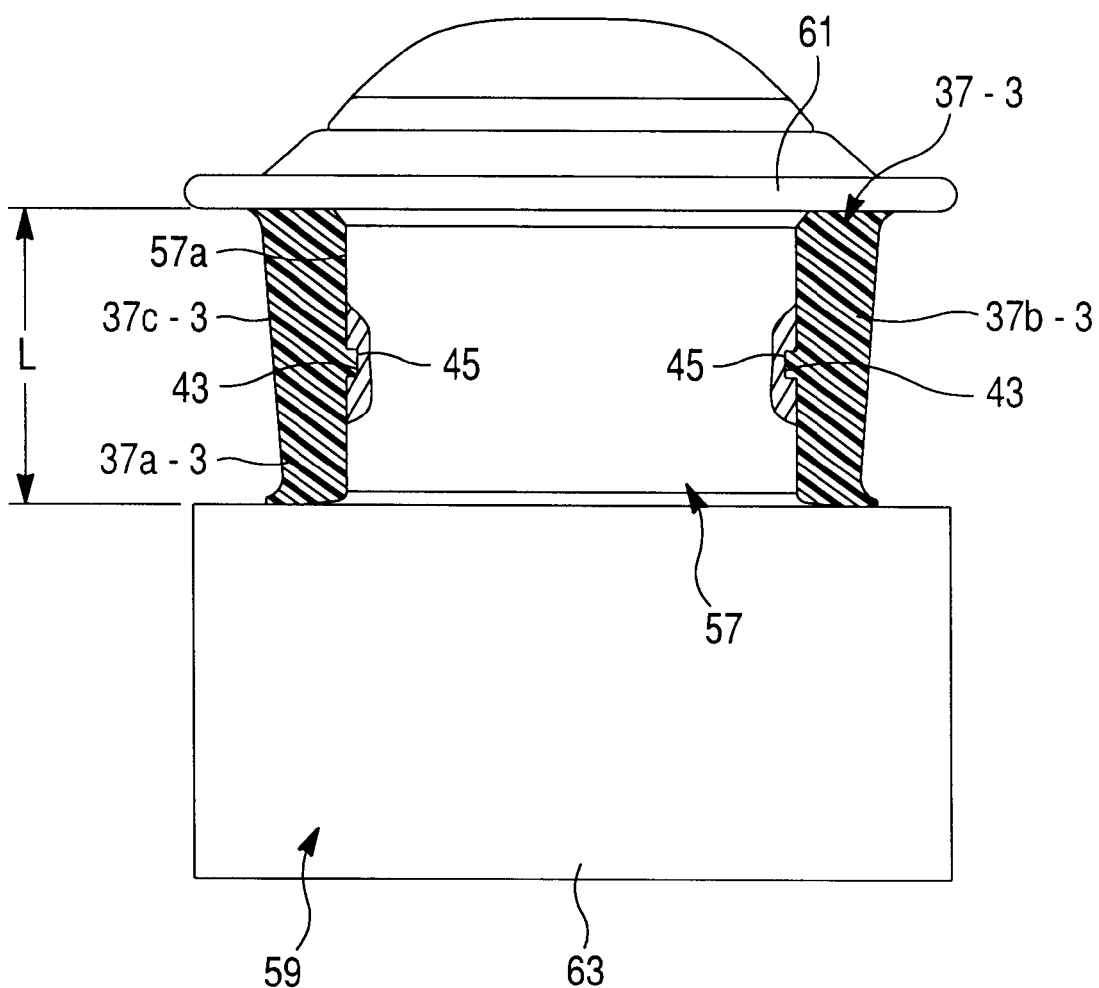
FIG. 7 is a longitudinally cross-sectional view of an auxiliary frame, which is attached to a spool, and a spool according to the fourth embodiment.
Figure 8:
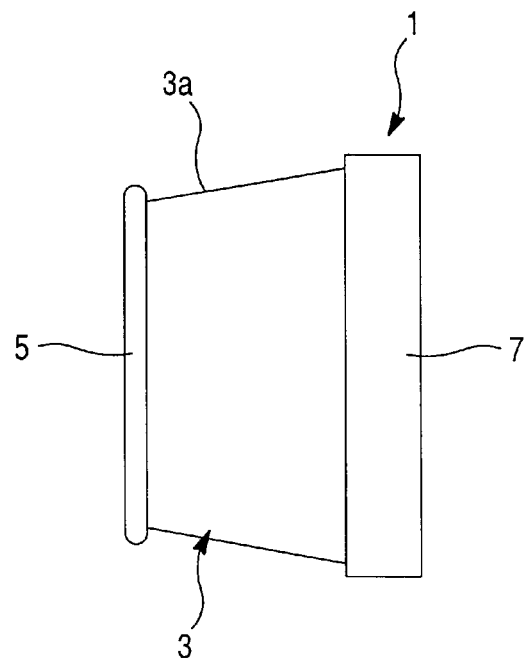
FIG. 8 is a front view of a conventional spool, the fishing line winding barrel of which is formed into a normally tapered shape.

FIG. 7 is a view showing a spool to which an auxiliary frame of a spool of the fourth embodiment according to the present invention is attached. In this embodiment, an auxiliary frame 37-3 of a spool having a fishing line winding face 37c-3, the shape of which is an inverse taper of a different taper angle from that of the fishing line winding face 57a concerned, is detachably attached to the fishing line winding barrel 57 of the spool 59 on which a fishing line winding face 57a of an inverse taper is formed. In the same manner as that of the first embodiment, the auxiliary frame 37-3 of the spool is composed of a pair of split frames 37a-3, 37b-3 made of light resin, the transverse cross-section of which is a semicircular and the size of which is the same as the size L of the fishing line winding barrel 57. Inner circumferences of the split frames 37a-3, 37b-3 are the same as the circumference of the fishing line winding face 57a.

Also in this embodiment, the same engaging pieces and engaging holes as those of the first embodiment are formed on the contact faces of both split frames 37a-3, 37b-3. Further, the same engaging pieces 45 and engaging holes 43 as those of the first embodiment are formed on the inner circumference and the fishing line winding face 57a of both split frames 37a-3, 37b-3. When both split frames 37a-3, 37b-3 are attached onto the fishing line winding face 57a by engaging the engaging pieces with the engaging holes, it is possible to form an auxiliary frame 37-3 of the spool having the fishing line winding face 37c-3, the shape of which is an inverse taper of a different taper angle from the fishing line winding face 57a as shown in FIG. 7.

In this embodiment, the maximum diameter of the auxiliary frame 37-2 of the spool is set to be smaller than the diameter of the front side flange 61 of the spool 59, and the fishing line is wound around the fishing line winding face 37c-3 of the A auxiliary frame 37-3 of the spool between the front side flange 61 and the rear side flange 63.

As explained above, in this embodiment, when the auxiliary frame 37-3 of the spool is attached to and detached from the fishing line winding face 57a of the spool 59, it is possible to change a taper angle of the inversely tapered face. Accordingly, in this embodiment, corresponding to various conditions and uses, which are estimated in the case of actual fishing, such as a type of fishing line to be used, a quantity of fishing line to be wound around the fishing line winding face, a method of fishing and a degree of skill of an angler, it is possible to take an appropriate countermeasure in accordance with the condition of actual fishing. Further, since the fishing line is wound into an inversely tapered shape, it is possible to prevent the fishing line from collapsing because an influence of energy can be avoided in the case of releasing the fishing line and also an influence of resistance of the fishing line can be avoided in the same manner as that of the spool 11 shown in FIG. 9.

As described above, when the auxiliary frame of the spool according to the present invention is used in such a manner that it is freely attached to and detached from the spool, corresponding to various conditions and uses, which are estimated in the case of actual fishing, such as a type of fishing line to be used, a quantity of fishing line to be wound around the fishing line winding face, a method of fishing and a degree of skill of an angler, it is possible to appropriately change a form of winding the fishing line, and also it is possible to take an appropriate countermeasure in accordance with the condition of actual fishing.

Further, the fishing line winding face of the auxiliary frame of the spool is formed into an inversely tapered shape. Therefore, when the auxiliary frame is used, it is possible to prevent the fishing line from collapsing because an influence of energy can be avoided in the case of releasing the fishing line and also an influence of resistance of the fishing line can be avoided.

What is claimed is:

1. A spool to be mounted to a spinning reel for fishing, said spool comprising:
   a fishing line winding barrel defining a first fishing line winding face;
   a front side flange connected to the fishing line winding barrel;
   a rear side flange connected to the fishing line winding barrel and opposite from the front side flange with respect to the fishing line winding barrel; and
   an auxiliary frame detachably attached to the fishing line winding barrel and defining a second fishing line winding face larger in diameter than the first fishing line winding face,
   wherein said winding barrel, said front side flange and said rear side flange are integral formed as a unitary body and the auxiliary frame is constructed by a pair of semicircular split frames circumscribing the first fishline winding face when they are coupled together on the first winding barrel.

2. The spool according to claim 1, wherein the split frames are connected together by a connecting piece.

3. The spool according to claim 1, wherein each of the split frames has an engaging piece protruding radially inwardly to be engaged with a corresponding engaging hole formed in the fishing line winding barrel.

4. The spool according to claim 1, wherein each of the split frames has an engaging piece and an engaging hole on circumferential end faces thereof, and the engaging piece and the engaging hole of one of the split frames are respectively engaged with the engaging hole and the engaging piece of the other of the split frames.

5. A spool to be mounted to a spinning reel for fishing, said spool comprising:
   a fishing line winding barrel defining a first fishing line winding face;
   a front side flange connected to the fishing line winding barrel;
   a rear side flange connected to the fishing line winding barrel and opposite from the front side flange with respect to the fishing line winding barrel; and
   an auxiliary frame detachably attached to the fishing line winding barrel and defining a second fishing line winding face larger in diameter than the first fishing line winding face,
   wherein said winding barrel, said front side flange and said rear side flange are integral formed as a unitary body and said second winding face is tapered.

6. A spool to be mounted to a spinning reel for fishing, said spool comprising:
   a fishing line winding barrel defining a first fishing line winding face;
   a front side flange connected to the fishing line winding barrel;
   a rear side flange connected to the fishing line winding barrel and opposite from the front side flange with respect to the fishing line winding barrel; and an auxiliary frame detachably attached to the fishing line winding barrel and defining a second fishing line winding face larger in diameter than the first fishing line winding face, wherein the diameter of said second fishing line winding face is gradually reduced in the direction from the front side flange to the rear side flange when the auxiliary frame is attached to the fishing line winding barrel in a first direction.

7. The spool according to claim 6, wherein the diameter of said second fishing line winding face is gradually reduced in the direction from the rear side flange to the front side flange when the auxiliary frame is attached to the fishing line winding barrel in a second orientation opposite from the first orientation.

8. A spool to be mounted to a spinning reel for fishing, said spool comprising:

a fishing line winding barrel defining a first fishing line winding face;

a front side flange connected to the fishing line winding barrel;

a rear side flange connected to the fishing line winding barrel and opposite from the front side flange with respect to the fishing line winding barrel; and an auxiliary frame detachably attached to the fishing line winding barrel and defining a second fishing line winding face larger in diameter than the first fishing line winding face, wherein the diameter of the first fishing line winding face is gradually reduced in the direction from the front side flange to the rear side flange.

9. A spool to be mounted to a spinning reel for fishing, said spool comprising:

a fishing line winding barrel defining a first fishing line winding face;

a front side flange connected to the fishing line winding barrel;

a rear side flange connected to the fishing line winding barrel and opposite from the front side flange with respect to the fishing line winding barrel; and an auxiliary frame detachably attached to the fishing line winding barrel and defining a second fishing line winding face larger in diameter than the first fishing line winding face, wherein said second fishing line winding face of said auxiliary frame defines a frustro-conical sleeve terminating at opposite terminal edges defining opposite openings in said auxiliary frame, and wherein said opposite edges are separated by a distance that is equal to or less than a length of said fishing line winding barrel in said axial direction.

10. A spinning reel for fishing, said spinning reel comprising:

a reel body;

a rotor rotatably attached to a front end of said reel body;

a spool for receiving fishing line thereon, said spool comprising a fishing line winding barrel defining a first fishing line winding face, a front side flange connected to the fishing line winding barrel and opposite from the front side flange with respect to the fishing line winding barrel;

at least one support arm attached to said rotor to extend in a longitudinal direction of said reel body, a bail member mounted on said support arm to direct said fishing line onto said spool; and an auxiliary frame detachably to the fishing line winding barrel and defining a second fishing line winding face larger in diameter than the first fishing winding face, wherein the diameter of said second fishing line winding face is gradually reduced in the direction from the front side flange to the rear side flange when the auxiliary frame is attached to the fishing line winding barrel in a first orientation.

* * * * *